United States Patent [19]

Gerhart

[11] 4,128,155
[45] Dec. 5, 1978

[54] TRANSITION ATTACHMENT FOR A CORE-SPACER-CORE MANDREL LOADER

[76] Inventor: James P. Gerhart, 1506 Pheasant Dr., Warminster, Pa. 18974

[21] Appl. No.: 792,235

[22] Filed: Apr. 29, 1977

Related U.S. Application Data

[63] Continuation of Ser. No. 629,416, Nov. 6, 1975, abandoned.

[51] Int. Cl.² ............................................. B65G 57/16
[52] U.S. Cl. ........................................ 193/46; 29/241; 29/760; 214/8; 214/DIG. 1
[58] Field of Search ............... 214/8, DIG. 1, DIG. 3, 214/DIG. 4, 65; 29/241, 433, 738, 609, 760; 211/54.1, 59.1; 193/46

[56] References Cited

U.S. PATENT DOCUMENTS

| | | | |
|---|---|---|---|
| 1,343,351 | 6/1920 | Collins | 29/738 |
| 1,391,202 | 9/1921 | Moore | 29/738 X |
| 1,818,592 | 8/1931 | Walworth | 214/8 X |
| 2,173,077 | 9/1939 | Minkel | 214/8 X |
| 2,283,629 | 5/1942 | Heftler | 29/433 |
| 2,973,108 | 2/1961 | Gable | 214/8 |
| 3,319,325 | 5/1967 | Nessamar et al. | 29/235 |
| 3,946,884 | 3/1976 | Kato et al. | 214/8 X |

Primary Examiner—L. J. Paperner
Attorney, Agent, or Firm—Joseph G. Denny, III; Peter J. Patane

[57] ABSTRACT

A core-spacer-core mandrel loader in which pairs of cores and spacers are automatically loaded upon a mandrel. A transition nose cone is attached to the mandrel to facilitate proper placement of the cores and spacers upon the mandrel.

3 Claims, 29 Drawing Figures

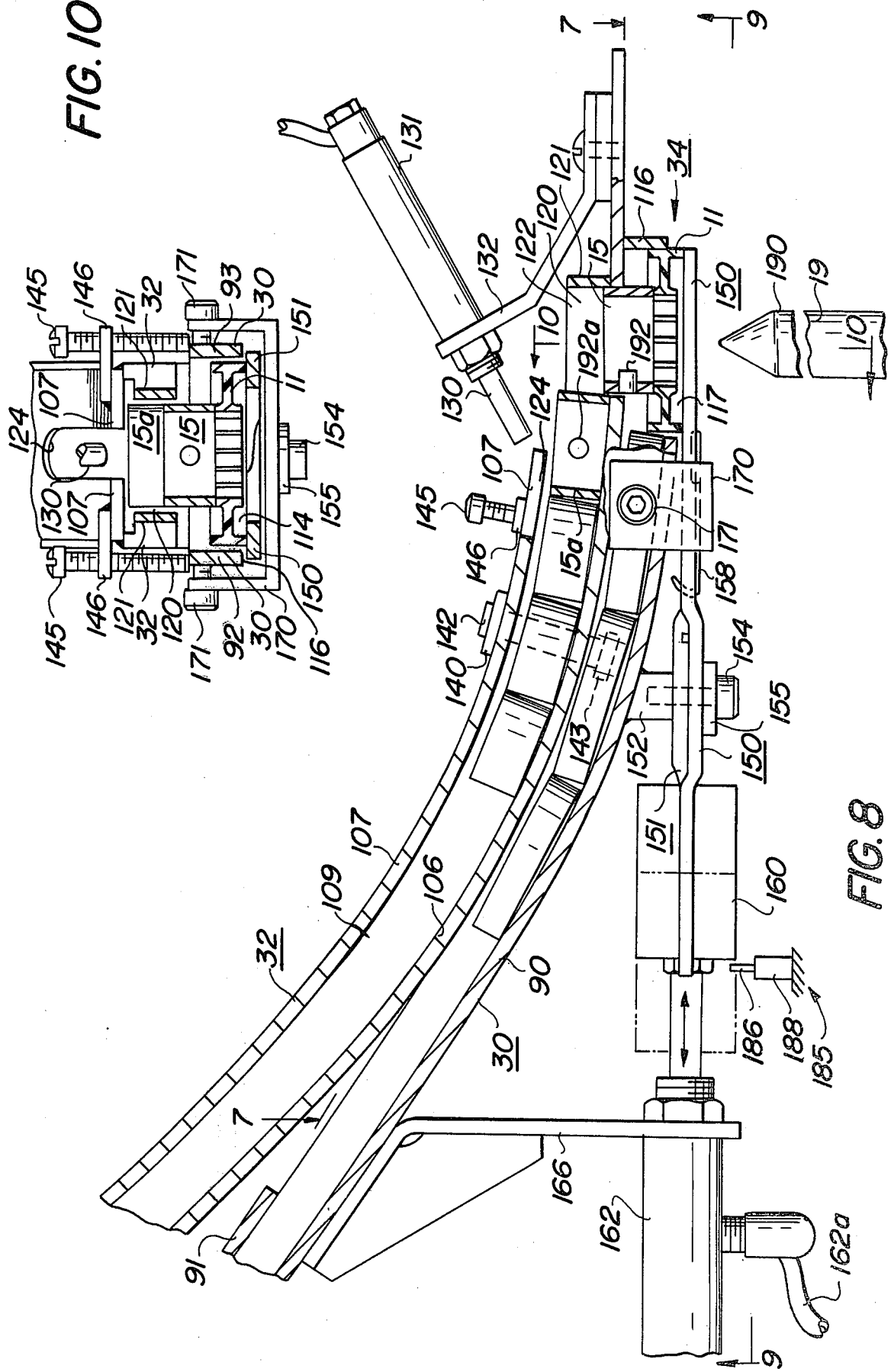

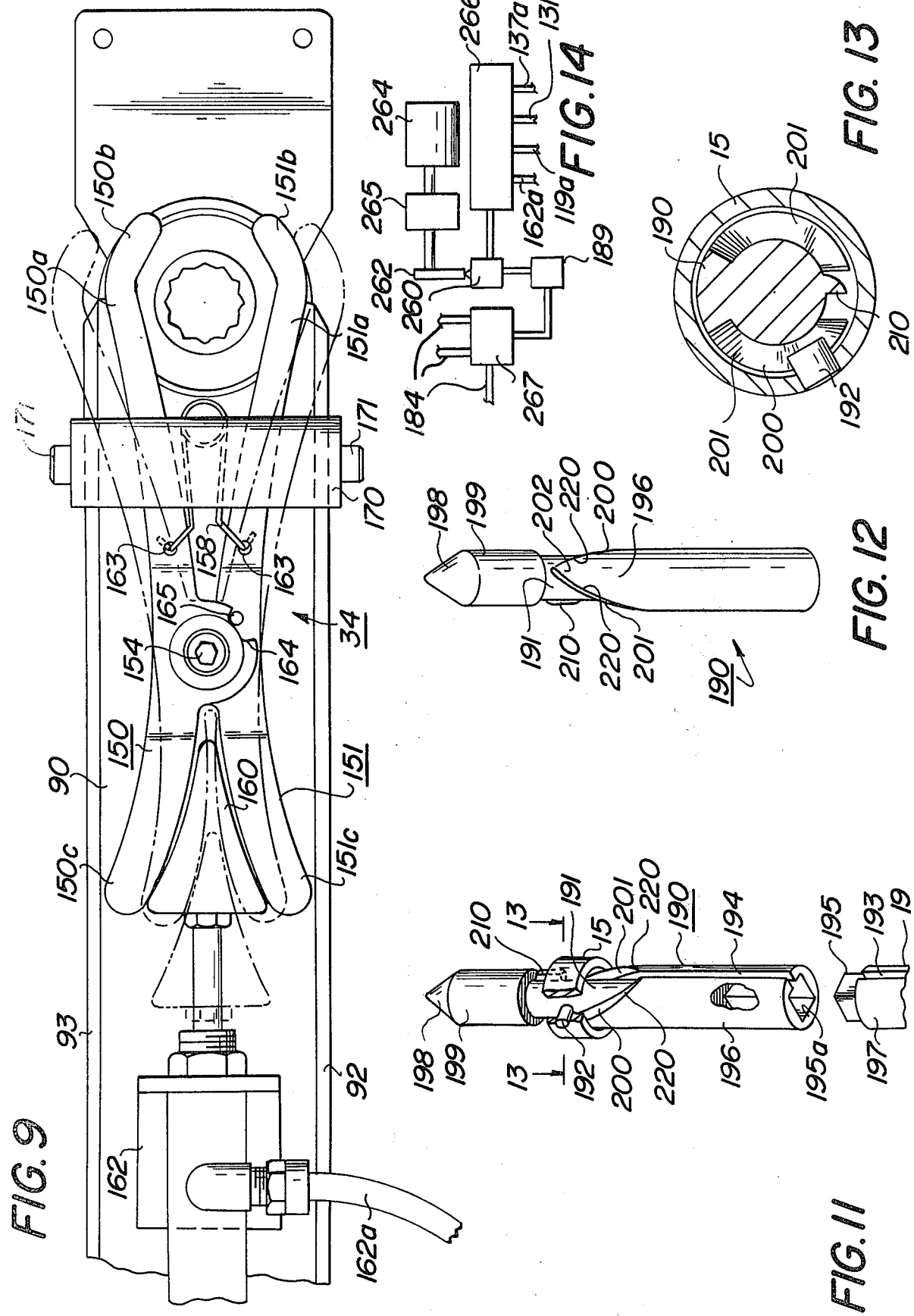

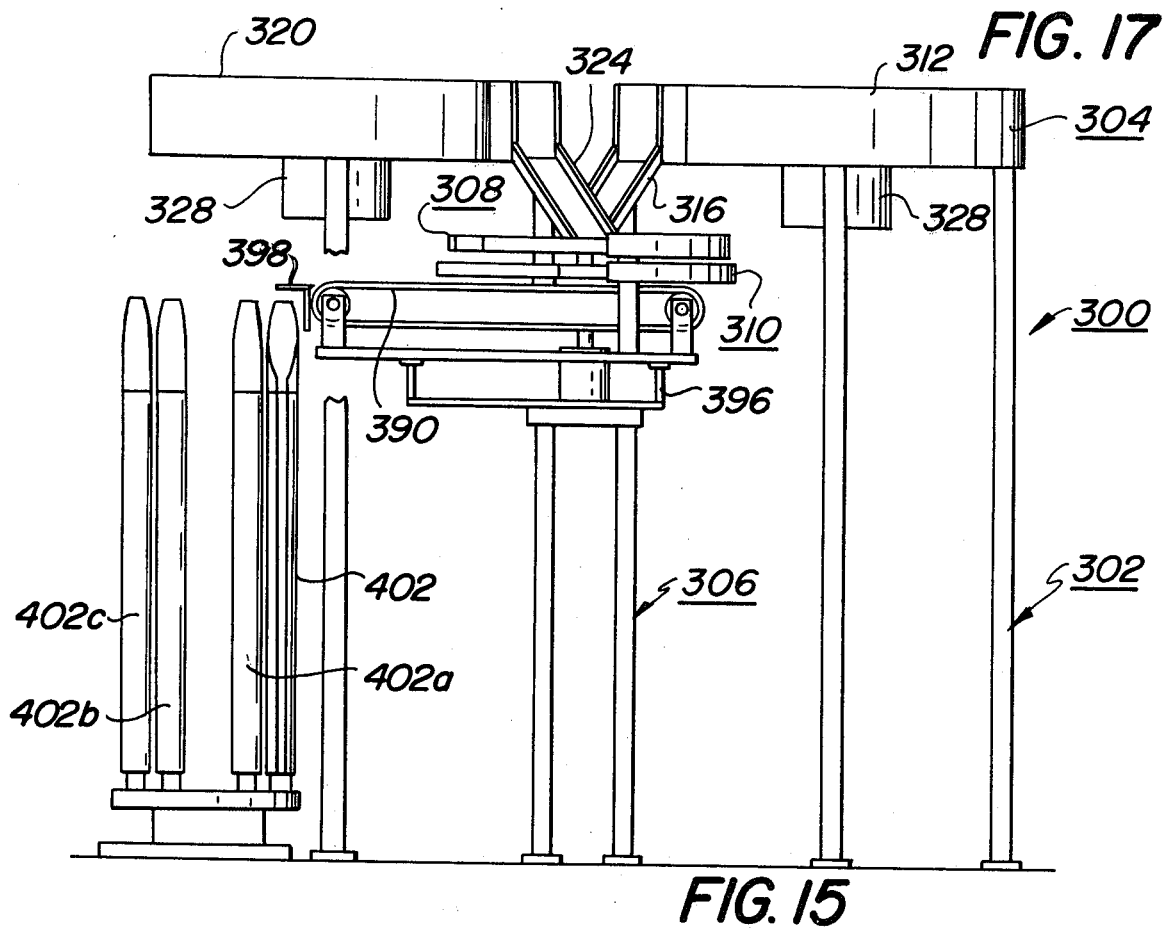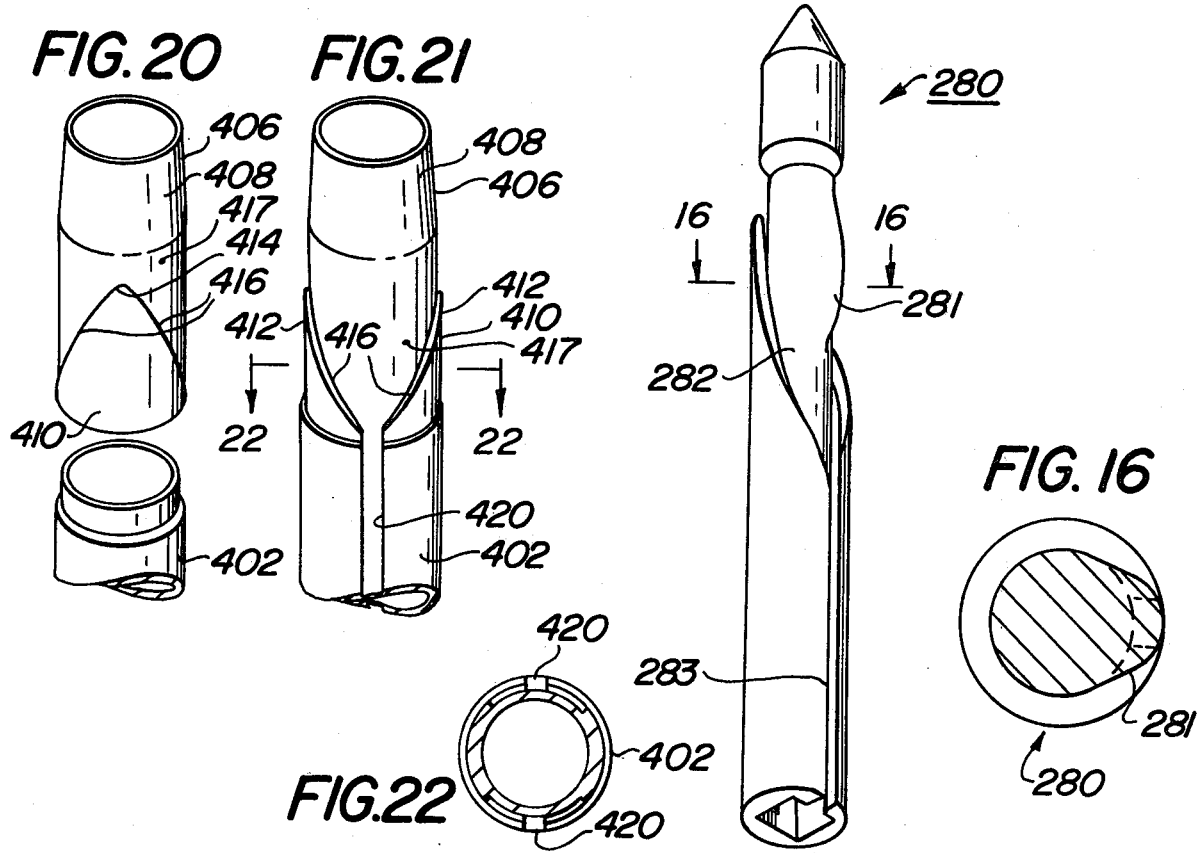

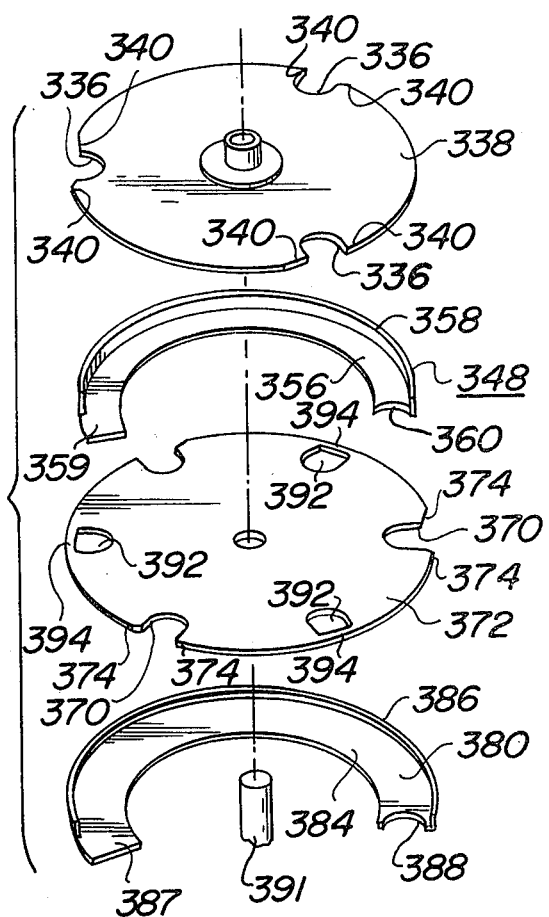
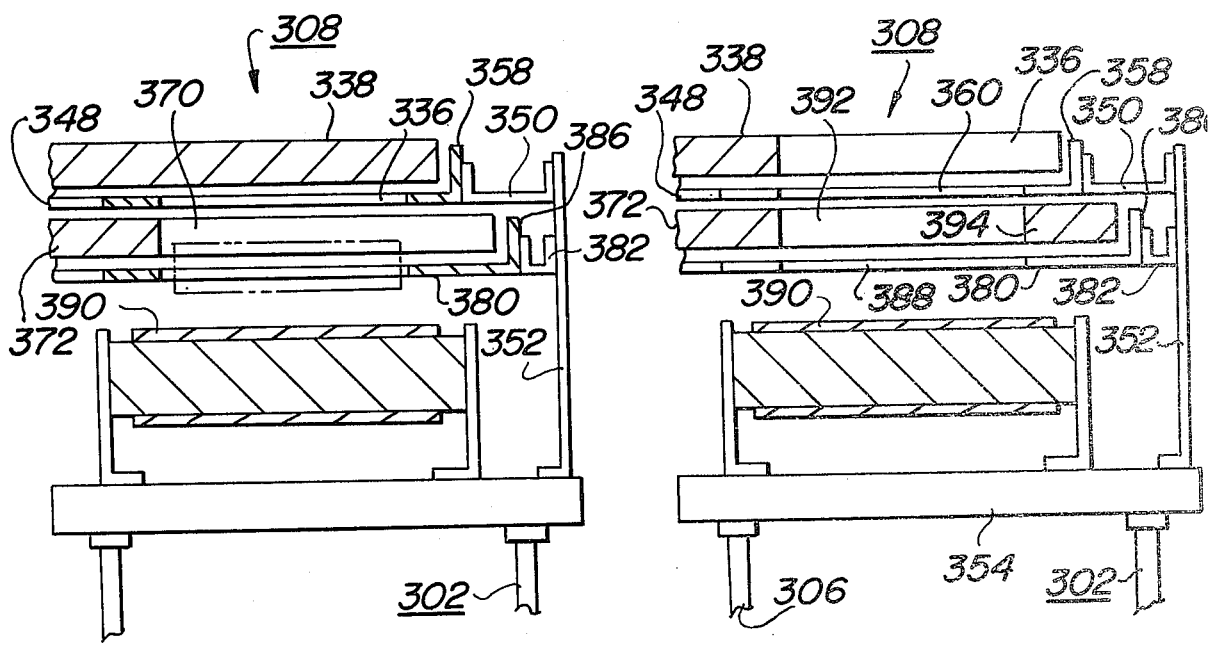
FIG. 23
FIG. 24  FIG. 25

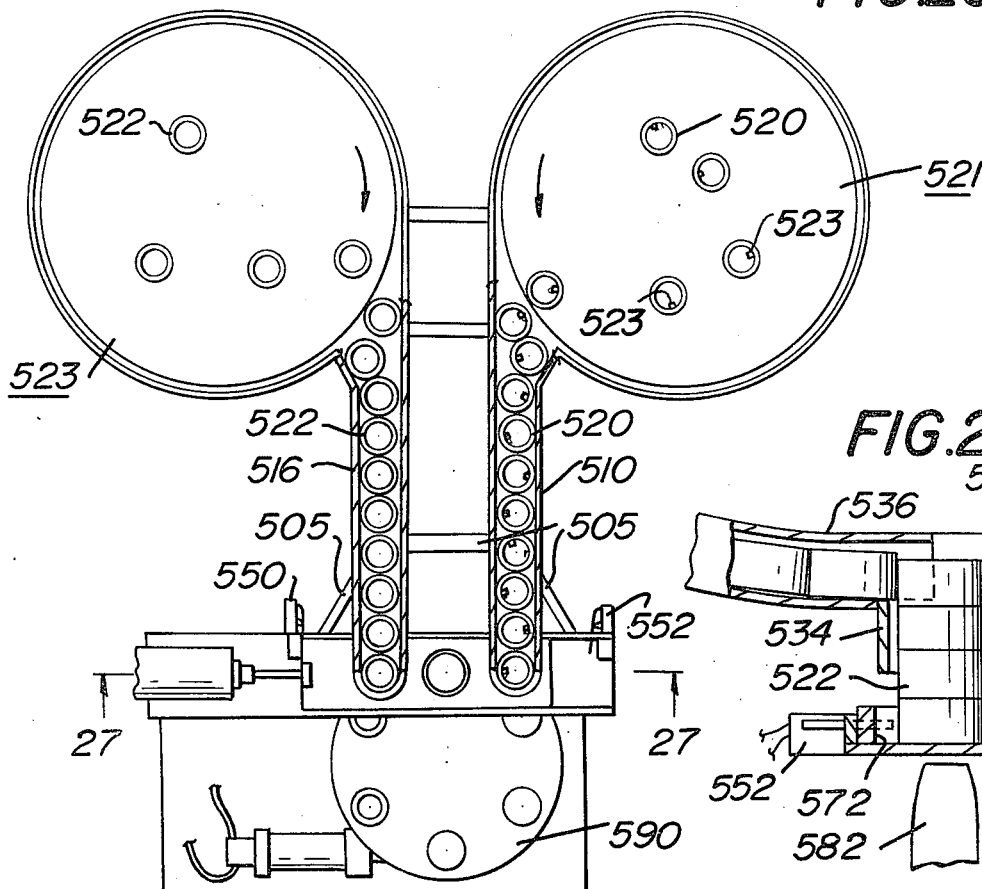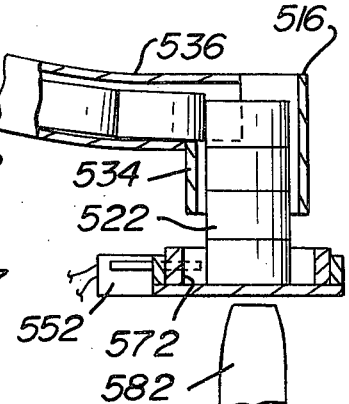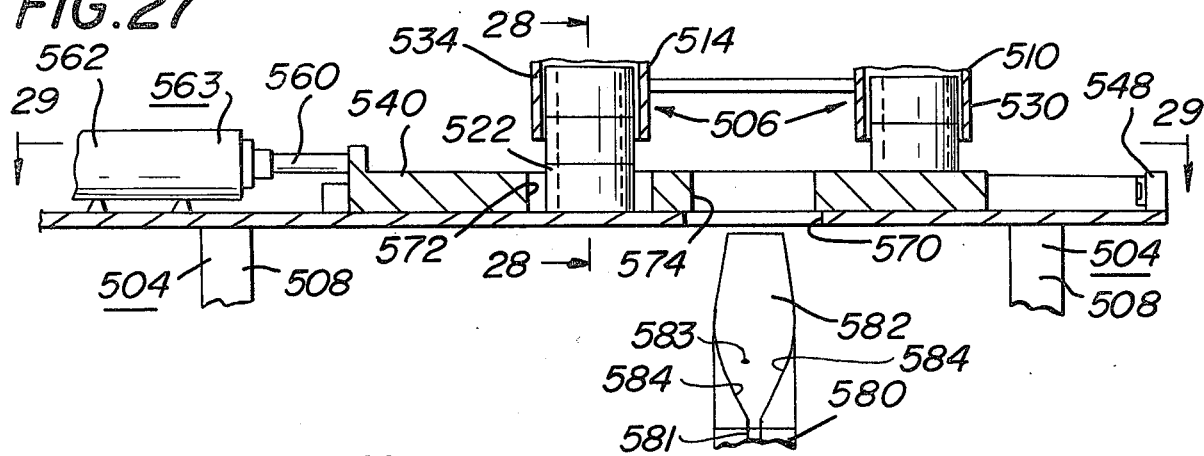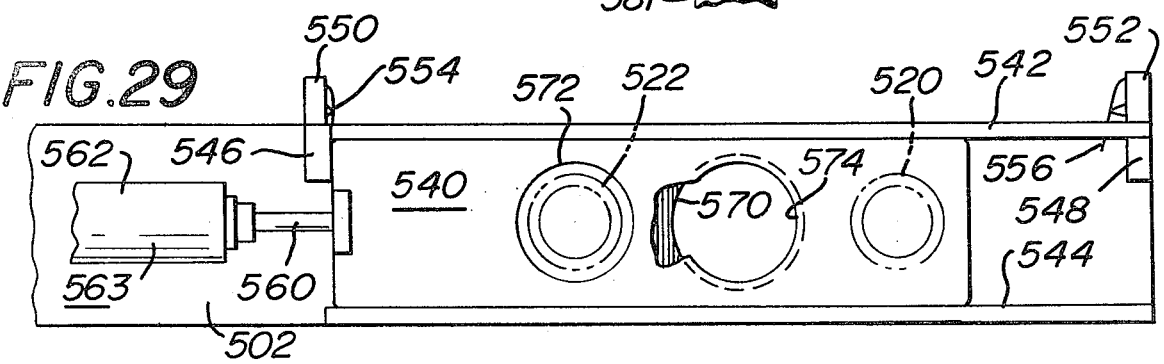

TRANSITION ATTACHMENT FOR A CORE-SPACER-CORE MANDREL LOADER

CONTINUATION

This application is a continuation of my copending patent application Ser. No. 629,416, filed Nov. 6, 1975, now abandoned.

RELATED PATENT

This patent relates generally to the subject matter of my U.S. Pat. No. 3,869,046.

BACKGROUND OF THE INVENTION

This invention relates to the automatic loading of cores and spacers alternately upon a mandrel. The so-loaded mandrel is then placed upon a machine which winds paper (or other material) slit into a tape or ribbon about the cores.

U.S. Pat. No. 3,869,046 issued to me discloses the automatic loading of a mandrel with cores spaced from each other along the length of the mandrel. The cores are first placed in a core box which properly aligns and spaces the cores from each other before being placed on the mandrel. After the mandrel is inserted into the array of cores, it is expanded radially to frictionally hold the cores thereto. The so-loaded mandrel may then be lifted from the core box and placed upon the machine which is to wind the paper (or other material) upon the cores.

The present invention relates to mandrels which are alternately loaded with cores and spacers so as to space the cores from each other instead of using a core box to space the cores from each other.

OBJECTS AND SUMMARY OF THE INVENTION

The principal object of this invention is to provide a machine for automatically loading a mandrel alternately with cores and spacers.

A further object of this invention is to provide a machine for automatically loading a mandrel alternately with cores and spacers faster than it may be loaded manually.

The preferred embodiment of this invention comprises a mandrel vertically supported and in alignment with the leading pair of cores and spacers. The second mandrel is automatically advanced to this position after the first mandrel is fully loaded.

Successive pairs of cores and spacers are held above the mandrel by a scissor-like mechanism in the preferred embodiment of the machine. The scissor-like mechanism opens and closes to permit pairs of cores and spacers to drop into the mandrel until a pre-selected number of the cores and spacers are placed about the mandrel. The loaded mandrel is thereafter removed and is placed upon the machine for winding paper (or other material) upon the cores.

The foregoing and other objects of the invention, the principles of the invention, and the best modes in which I have contemplated applying such principles will more fully appear from the following description and accompanying drawings in illustration thereof.

BRIEF DESCRIPTION OF THE DRAWINGS

In the drawings,

FIG. 3 is a partial top plan view taken along the line 3—3 in FIG. 2;

FIG. 8 is a partial cross sectional view showing the chutes and the scissor-like mechanism in front elevation, the view being taken along the line 8—8 in FIG. 6;

FIG. 9 is a bottom plane view of the scissor-like mechanism taken along the line 9—9 in FIG. 8;

FIG. 10 is a cross sectional view of the chutes and the scissor-like mechanism taken along the line 10—10 in FIG. 8;

FIG. 11 is a bottom perspective view showing the transition nose cone attachable to the mandrel and also partially showing the mandrel;

FIG. 12 is a top perspective view of the transition nose cone shown in FIG. 11, but the nose cone has been rotated 180° relative to the position shown in FIG. 11;

FIG. 13 is a cross sectional view taken along the line 13—13 in FIG. 11;

FIG. 14 is a schematic illustration of the air supply and control system for the core-spacer-core mandrel loading machine;

FIG. 15 is bottom perspective view of a modified transition nose cone;

FIG. 16 is a cross sectional view taken along the line 16—16 in FIG. 15;

FIG. 17 is a front elevational view illustrating a modification of my core-spacer-core mandrel loading machine taken along the line 17—17 in FIG. 18;

FIG. 20 is a top perspective, exploded view showing a further modification of the transition nose cone for use with the mandrel loading machine shown in FIGS. 17 and 19, FIG. 20 also showing the upper portion of the mandrel;

FIG. 21 is a top perspective view of the transition nose cone and mandrel shown in FIG. 20, but assembled to each other and showing the cone and mandrel rotated 180° relative to FIG. 20;

FIG. 22 is a cross sectional view taken along the line 22—22 in FIG. 21;

FIG. 23 is an exploded view of the rotating receiving plates and stationary arc plates shown in FIGS. 17 to 19, inclusive;

FIG. 24 is a partial cross sectional view taken along the lines 24—24 in FIG. 19;

FIG. 25 is a partial cross sectional view similar to FIG. 24 but after the core plate and the spacer plate have rotated 60° from the position shown in FIG. 19;

FIG. 26 is a partial top plan view, partly in cross section, of a further modified core-spacer-core loading machine;

FIG. 27 is a sectional view of the loading machine shown in FIG. 26, the view being taken along the line 27—27 in FIG. 26;

FIG. 28 is a partial, side view taken along the line 28—28 in FIG. 27; and

FIG. 29 is a partial top plan taken along the line 29—29 in FIG. 27.

DESCRIPTION OF THE PREFERRED EMBODIMENT

Figure 1:
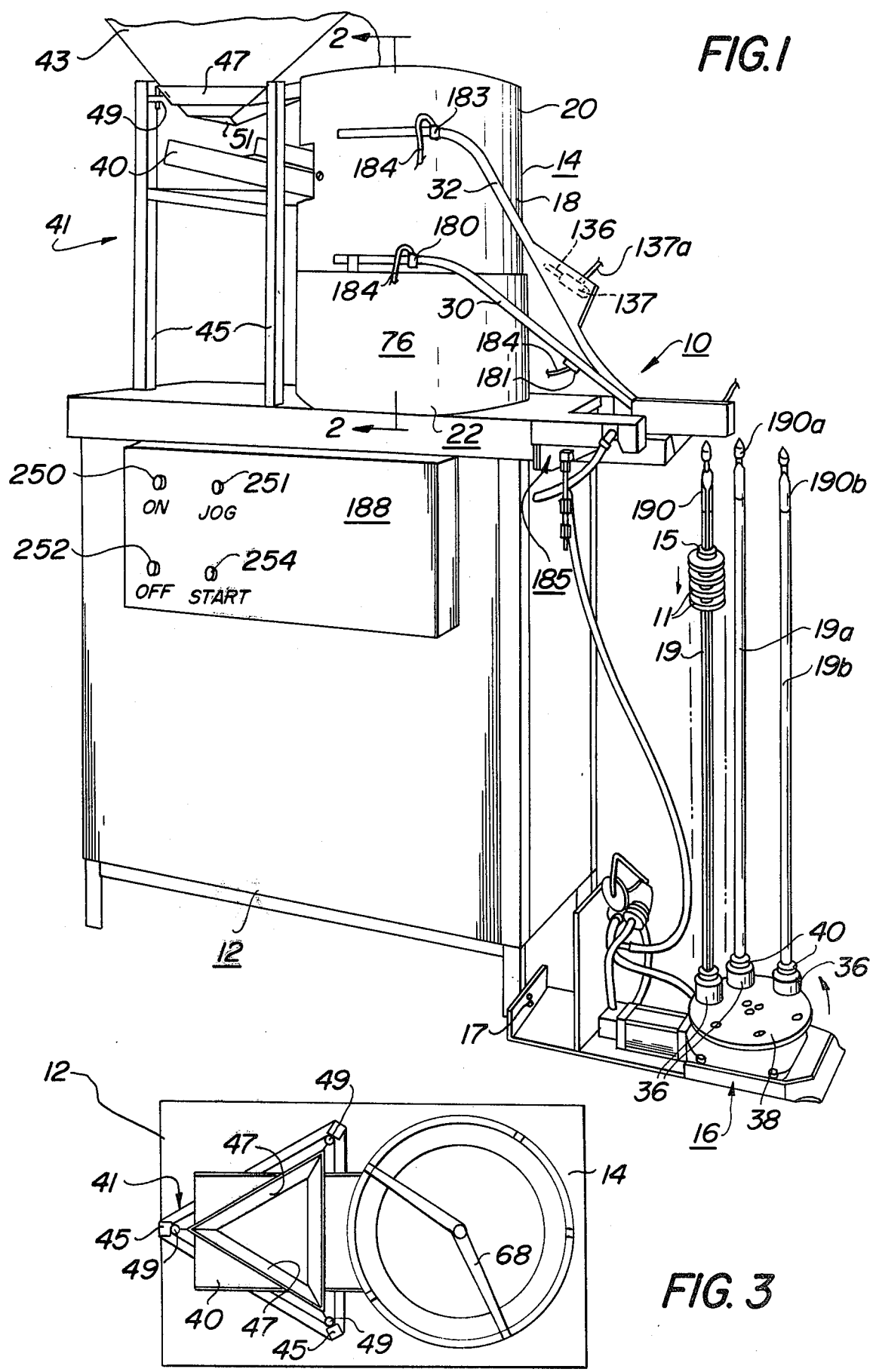
FIG. 1 is a front, elevation view of my new automatic core-spacer-core loading machine.

Referring to the drawings, the core-spacer-core loading machine 10 comprises a base 12 having a table 13 supporting a hopper and chute assembly 14 and a frame 41 and an indexing mechanism 16 for alternately loading cores 11 and spacers 15 on mandrels or shafts 19, 19a and 19b. The indexing mechanism 16 may be suitably secured, such as by bolts 17, to the base 12.

Figure 2:
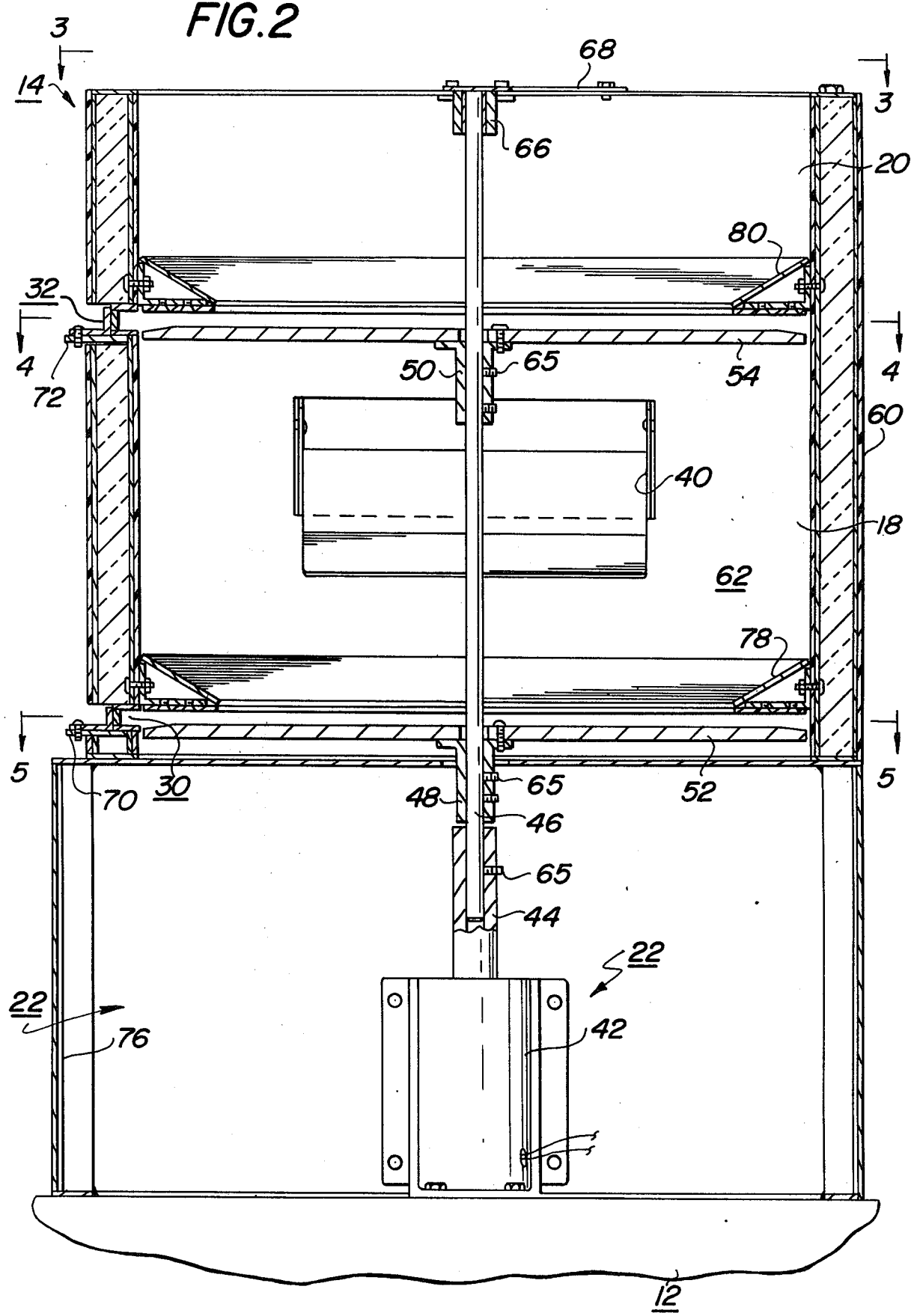
FIG. 2 is a sectional view taken along the line 2—2 in FIG. 1.

The hopper and chute assembly 14 comprises a core hopper 18 and a spacer hopper 20 axially and centrally aligned one over the other, as shown in FIGS. 1 and 2, and rotated by a drive motor and mechanism 22.

The cores 11 are delivered to the mandrel 19 by a core chute 30. Likewise, the spacers 15 are delivered to the mandrel 19 by a spacer chute 32. The chutes 30 and 32 are in communication at their upper ends with the hoppers 18 and 20, respectively, and at their lower ends with an escapement means which in this embodiment comprises a scissor-like core holder mechanism 34, FIGS. 1, 8, 9 and 10. In FIG. 1 the scissor-like mechanism 34 and the front end portions of the chutes 30 and 32 are covered by a suitable housing 35.

The mandrels 19, 19a and 19b are vertically placed in cups 36 secured on a rotatable table 38 forming part of the indexing mechanism 16. The mandrels 19, 19a and 19b include collars 40 secured to their lower ends which are slidably received and held in the cups 36.

The cores 11 are placed in the core hopper 18 through a side entry chute 40, FIGS. 1 and 2. The spacers 15 are placed in the spacer hopper 20 through the open top thereof.

The frame 41 is provided to support a carton 43 containing the cores 11. The frame 41 comprises vertical standards 45 and three triangularly arranged and inclined struts 47. The struts 47 support the carton 43 so that one corner 51 of the carton is lower than the others, as shown in FIG. 1. The lowest corner 51 is cut open and the cores 11 drop through onto the entry chute 40. The struts 47 are secured to posts 49 which are adjustably secured to the vertical standards 45 so as to accommodate different size cartons.

The drive mechanism 22 includes a motor 42, FIG. 2, which rotates a shaft 44. The shaft 44 is connected to a rod 46 which extends through collars 48 and 50. The collars 48 and 50 are secured to two horizontal rotatable discs 52 and 54 on which are loaded the cores 11 and spacers 15, respectively. A cylindrical housing 60 and the two rotating discs 52 and 54 defines two bins 62 and 64 for the cores 11 and spacers 15, respectively, FIGS. 4 and 5. The rod 46 is secured to the shaft 44 and to the collars 48 and 50 by suitable set screws 65, as shown in FIG. 2. The upper end of the rod 46 may be received in a suitable bearing 66 carried by a plate 68 suitably secured to the housing 60.

The housing 60 is provided with suitable slots to receive the upper ends of the chutes 30 and 32. The upper ends of the chutes 30 and 32 are suitably secured to brackets 70 and 72, FIGS. 2, 4 and 5, the brackets 70 and 72 being, in turn, suitably secured to the housing 60.

The motor 42 is secured to the base 12, as shown in FIG. 2, and is surrounded by a suitable enclosure 76. The enclosure 76 rests upon and is secured to the top of the base 12, as shown in FIGS. 1 and 2. Also, the housing 60 rests upon and is secured to the enclosure 76, as shown in FIGS. 1 and 2.

Within the core storage bin 62 is placed a guide cone 78 suitably secured to the housing 60 and spaced above the rotating disc 52. Likewise, within the spacer storage bin 64 is placed a guide cone 80 suitably secured to the housing 60 and spaced above the rotating disc 54.

Figure 5:
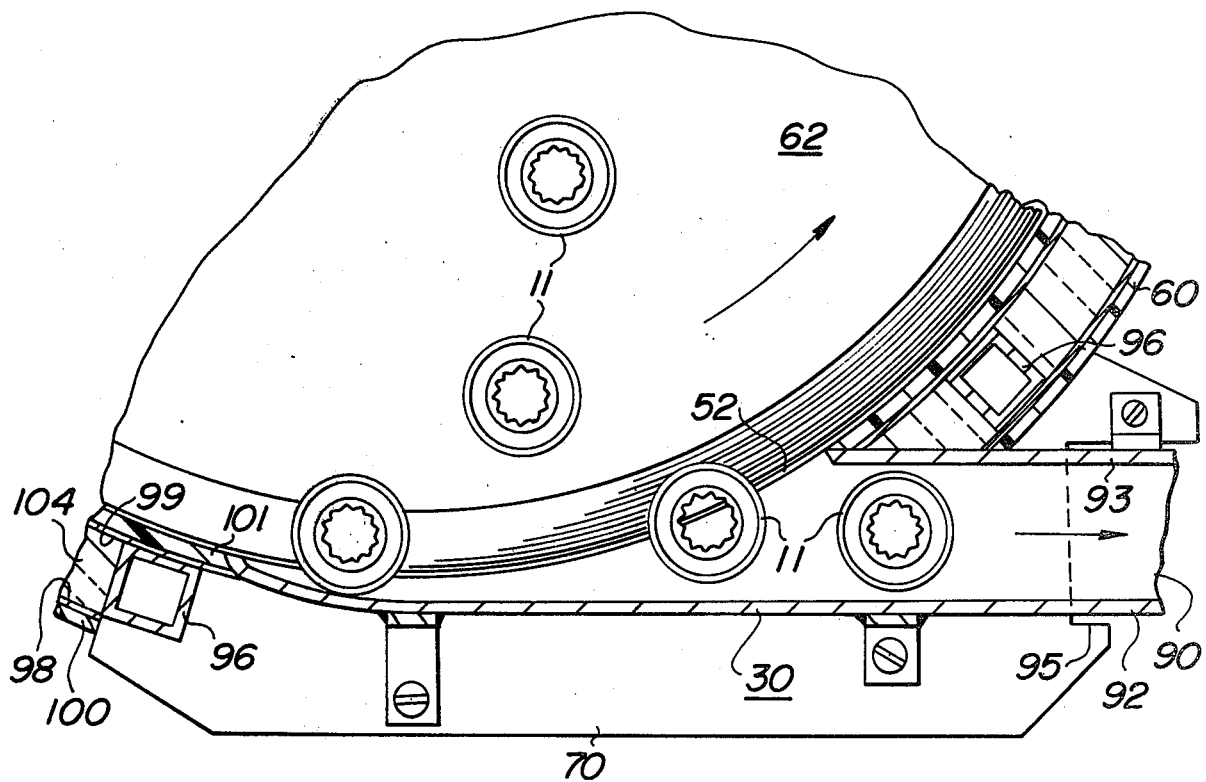

The core chute 30, FIGS. 2, 5 and 8, comprises bottom and upper walls 90 and 91 secured to each other by side walls 92 and 93 to define the open ended chute 30 whose upper end is in communication with the core storage bin 62. As shown in FIG. 5, the upper end of the chute 30 is contoured to the arcuate shape of the disc 52 to form an arcuate opening in communication with the bin 62. The bracket 70 is welded (or otherwise secured) to upright tubes 96, FIG. 5. The chute side walls 92 and 93 are secured by lugs 97 to the bracket 70. The right hand end of the bracket 70, FIG. 5, has a slot 95 through which extends the chute 30 as it slopes down from the height of the disc 52 toward the mandrel 19.

Figure 4:
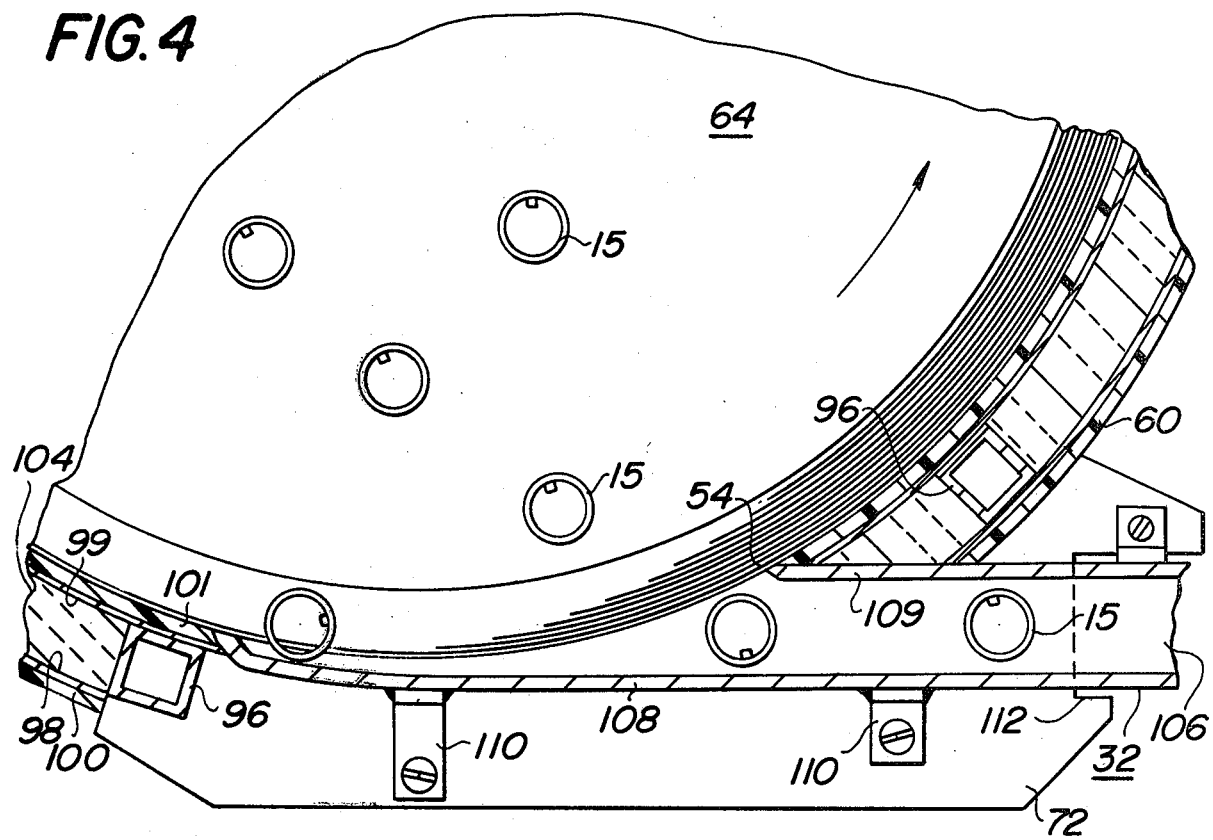
FIGS. 4 and 5 are partial cross section views taken along the lines 4—4 and 5—5, respectively, in FIG. 2.

The housing 60 is formed by six upright tubes 96 (only two being shown in FIGS. 4 and 5). Sheet metal walls 98 and 99 are secured to the tubes 96. Secured to the sheet metal walls 98 and 99 are plastic sheet walls 100 and 101 for sound insulation. The annular spaces between the tubes 96 and the sheet metal walls 98 and 99 are also filled with a plastic material 104 for sound insulation.

The spacer chute 32, FIGS. 2, 4 and 8, comprises bottom and upper walls 106 and 107 secured to each other by side walls 108 and 109 to define the open ended spacer chute 32 whose upper end is in communication with the spacer storage bin 64. As shown in FIG. 4, the upper end of the chute 32 is contoured to the arcuate shape of the disc 54 to form an arcuate opening in communication with the bin 64. The bracket 72 is welded (or otherwise secured) to the upright tubes 96, FIG. 4, and the chute side walls 108 and 109 are secured by lugs 110 to the bracket 72. The right hand end of the bracket 72, FIG. 4, has a slot 112 through which extends the chute 32 as it slopes down from the height of the disc 54 toward the mandrel 19.

Figure 7:
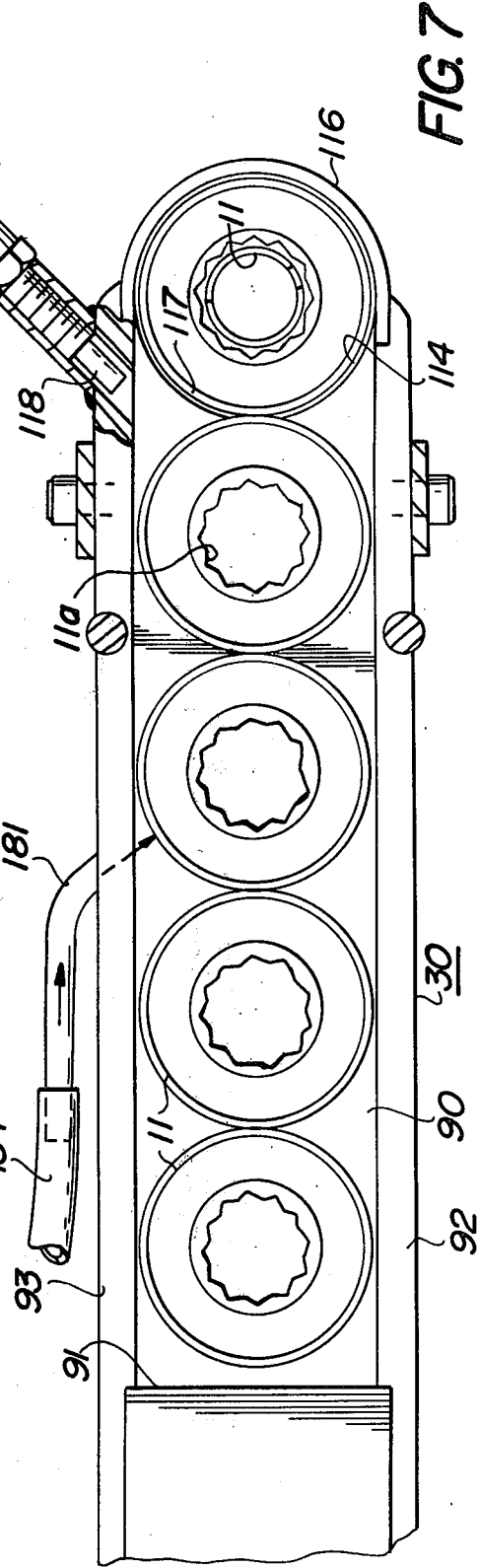
FIG. 7 is a partial top view taken along the line 7—7 in FIG. 8.

Referring to FIGS. 7 and 8, the forward ends of the chutes 30 and 32 overhang the mandrel 19. The chutes 30 and 32 overlie each other, are axially and vertically aligned with each other, and converge, as shown in FIGS. 8 and 10. Preferably, the forward end of the cover 91 of the chute 30 is cut short so that the overlying bottom wall 106 of the (upper) spacer chute 32 then forms the top wall of the core chute 30, as shown in FIG. 8.

The right hand end of the bottom wall 90 is formed with a semi-circular shape 114, as shown in FIG. 7, and together with the semi-circular band or stop ring 116 is attached to the side walls 92 and 93 to form an opening 117 through which the cores 11 and spacers 15 may drop onto the mandrel 19. To control and facilitate the movement of the lead core 11 through the opening 117, the weight of the column of cores behind the lead core is taken up by a plunger 118 which pushes against the second core in the row and momentarily stops the downward movement of the column, so as to allow a predetermined timed sequence. The plunger 118 is actuated by high pressure air acting upon a piston (not shown) within a cylinder 119, the plunger 118 extending through a suitable opening in the side wall 93. The plunger 118 is extended forward to its fullest extent by high pressure air within the cylinder 119. The cylinder 119 is carried by the side wall 93, as generally shown in FIG. 7. When the high pressure air is released from the cylinder 119, a spring within the cylinder will fully retract the plunger 118 to the position shown in FIG. 7.

Figure 6:
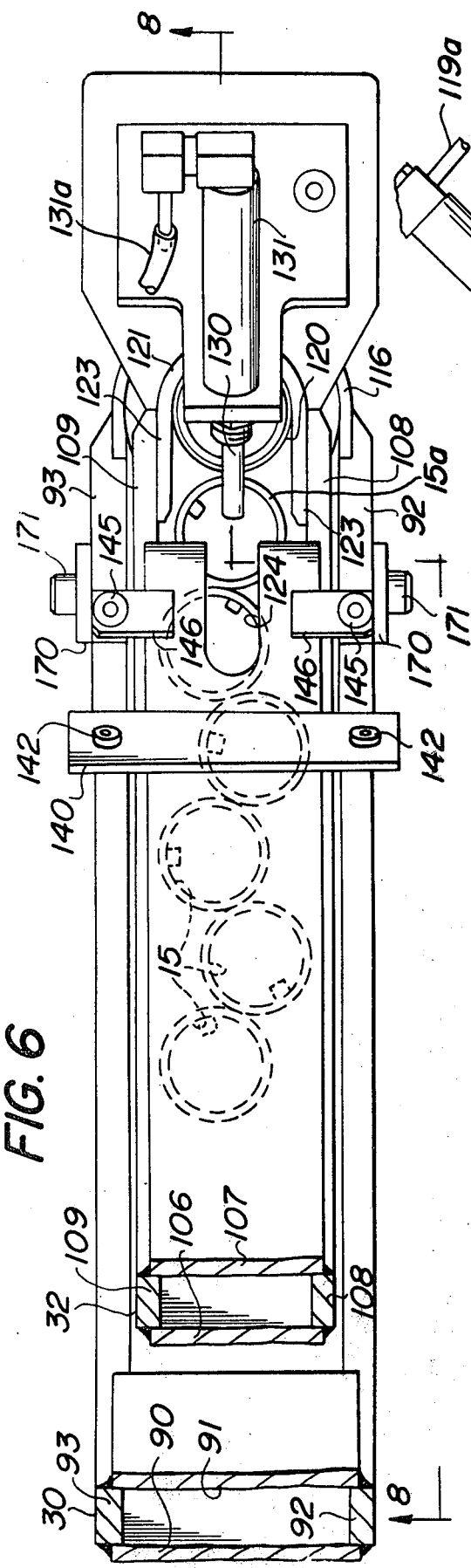
FIG. 6 is a partial top view taken along the line 6—6 in FIG. 8.

Referring to FIGS. 6, 8 and 10, the bottom wall 106 of the (upper) space chute 32 terminates over the leading core 15 so as to coaxially align a spacer 15 over a corresponding core 11. The botom wall 106 has a forward semi-circular shape 120, FIG. 6, which together with a semi-circular band or stop ring 121 defines an opening 122 through which the leading spacer 15 may drop onto the leading core 11. The band 121 has legs 123 secured to the side walls 108 and 109, as shown in FIG. 6.

The forward end of the upper wall 107 terminates over the second forwardmost spacer, as shown in FIGS. 6 and 8, and has a slot through which extends a plunger 130. The plunger 130 controls and facilitates the movement of the spacers 15 through the opening 122, the weight of the column of spacers behind the lead spacer being taken by the plunger 130. Also, the plunger 130 stops the movement of the column of spacers so as to allow a predetermined time sequence in synchronism with the timed sequence of the plunger 118. The plunger 130 is actuated by an air operated piston (not shown) within a cylinder 131. The cylinder 131 is mounted on an angled plate 132 mounted on a horizontal plate 134 which is welded to the front edge of the band 121 and the front edge of the bottom wall 106.

Another plunger 136 and cylinder 137 may be suitably mounted on the top wall 107 of the chute 32 intermediate the ends thereof to take some of the weight of the spacer column, as schematically shown in FIG. 1.

The forward or right hand ends of the chutes 30 and 32 are clemped to each other by a plate 140, FIGS. 6 and 8, overlying the (upper) chute 32 and suitable studs 142 extend through the plate 140 and into suitable threaded nuts 143 (FIG. 8) carried by the sides 92 and 93 of the (lower) chute 30. Fine height adjustment of the forward ends of the two chutes 30 and 32 relative to each other may be made by screws 145 which extend through brackets 146 welded to the top wall 107. The lower end of screws 145 bear against the side walls 92 and 93 of the (lower) core chute 30.

The leading core 11 and the leading spacer 15 are restrained from dropping by the scissor-like mechanism 34, FIGS. 8, 9 and 10. The scissor-like mechanism 34 comprises two arms 150 and 151 pivoted together about a stud 154. The stud 154 is threaded into the lower end of a column 152 which is welded to the bottom wall 90 of the chute 30, FIG. 8. The stud 154 supports a suitable washer 155 so that the arms 150 and 151 bear against the lower surface of the column 152 and the upper surface of the washer 155.

The arms 150 and 151 are spring biased by a torsion spring 158 to the dotted line position shown in FIG. 9 in which the core 11 is not restrained from falling through by the right end portions of the longer portions of the arms 150 and 151. The extreme right hand portions of the arms 150 and 151 which underlie the opening 117 in the core chute 30 have a general "V" shape facing each other. The arm 150 comprises parts 150a and 150b, and the arm 151 comprises parts 151a and 151b, the parts 150a, 150b, 151a and 151b jointly defining a jaw. The addition of the forwardmost portions 150b and 151b (the right most portions) of the "V" shape were necessary, it was observed, because the cores 11 sometimes tipped (in passing through the opening 117) in such a way as to not be caught by the rearwardmost portions 150a and 151a of the "V" shape.

The rear portions 150c and 151c, of the arms 150 and 151, as shown in FIG. 9, together form a "V" shape lying on its side. Between the arm portions 150c 151c is disposed a "V" shaped plunger 160 retracted by an air operated piston (not illustrated) housed within a cylinder 162 and extended to the full line position of FIG. 9 by a spring (not shown) within the cylinder 162. The plunger 160 is controlled and timed relative to the plungers 118 and 130 so as to be retracted (to the dotted line position of FIG. 9) by a pulse of high pressure air within the cylinder 162 when it is desired to permit a core 11 and spacer 15 to drop through the opening 117.

The cylinder 162 is threaded to a bracket 166 the bracket 166 depending from and being suitably secured to the bottom wall 90 of the core chute 30, as shown in FIG. 8.

To prevent the cores from dropping through the scissors-like mechanism 34, the plunger 160 must be in its forward or solid line position (FIG. 9) in which it overcomes the bias of the spring 158 and closes the jaws 150a, 150b, 151a and 151b of arms 150 and 151. When the machine is "off," that is, when no high pressure air is being supplied to the cylinder 162, the spring (not shown) within the cylinder 162 pushes the plunger 160 to its forwardmost position and the plunger 160 remains in its forwardmost (full line) position (FIG. 9), blocking any cores 11 from dropping through the opening 114.

As shown in FIG. 9, the spring 158 has end portions which extend through suitable holes 163 in the arms 150 and 151 and are bent over to thereby carry the spring 158 and bias the jaws 150a, 150b, 151a, and 151b to the open position, the dotted line position of FIG. 9. Further, the arm 150 is formed with an arcuate notch 164 defined by opposite end walls which engage a depending projection 165 extending frm the arm 151 to limit pivotal movement of the arms 150 and 151 relative to each other. Also, a guard and support in the form of a U-shaped bracket 170, FIGS. 9 and 10, is suitably secured to the side walls 92 and 93 of the core chute 30, such as by studs 171. The bracket 170 guards against accidental blows to the arms 150 and 151 and if there should accidentally be a downward force placed on the jaws 150a, 150b, 151a and 151b, the bracket 170 will limit downward movement of the arms 150 and 151.

To assist the movement of the cores 11 and spacers 15 down the chutes 30 and 32, the chute 30 is provided with two nozzles 180 and 181 supplying jets of high pressure compressed air to push the cores 11 and the spacers 15 down the chutes, FIGS. 1 and 7. The nozzle 180, FIG. 1, extends through the top wall 91 of the chute 30 and nozzle 181 extends through the side wall 93 of the chute 30, as shown in FIG. 7, directing blasts of suitably compressed air at the row of cores 11, tending to push them down the chute 30. Likewise, a nozzle 183, FIG. 1, is connected to the top wall 107 of the chute 32 to also supply a jet of compressed air for pushing the row of spacers 15 down the chute 32. The nozzles 180, 181 and 183 are supplied by suitable hoses 184 which are, in turn, connected to a suitable source 189 of compressed air, shown diagrammatically only in FIG. 14, through manifold 267.

To count the number of cores 11 and spacers 15 as they drop through the scissors-like mechanism 34, a counting device 185, FIGS. 1 and 8, is provided comprising a leaf 186 forming part of a switch 188 mounted to an extension secured to the base 12 so that the leaf 186 is in the path of movement of the plunger 160. Each time the plunger 160 retracts (permitting the jaw 150a, 150b, 151a and 151b to open) the leaf 186 is pivoted and the switch 188 is energized to count the page of a core 11 and spacer 15, thus providing an indirect, but accurate, count of the number of cores 11 and spacers 15 which have dropped onto the mandrel 19. When the predetermined number is counted, the device 185 shuts off the flow of compressed air to the air manifold 266, FIG. 14.

After the lead core 15 and spacer 11 drop through the openings 117 and 120, the control system energizes the cylinders 119 and 131 to retract the plungers 118 and 130, respectively, to permit the next pair of cores 15a and spacers 11a to assume the lead position upon the jaws 150a, 150b, 151a and 151b which have in the meantime already closed. After the next pair assumes the lead position on the closed jaws, the arms 150 and 151 again are separated by retraction of the plunger 160 and the cycle is repeated until the mandrel 19 is fully loaded at which time the counter switch 188 suspends operation of the machine and the jaws are kept closed, until the table 38 indexes the next mandrel 19a under proper alignment with the lead core 11 at which time a limit switch (not shown) but which is attached to the indexing table 38, closes starting the second cycle of the machine.

All of the plungers 118, 130, 136 and 160 are spring loaded by springs (not shown) within the cylinders 119, 131, 137 and 162, respectively. The plunger 160 is biased by the spring to its forward or rightmost position in FIGS. 8 and 9 and the high pressure high within the cylinder 162 will retract the plunger to its leftwardmost position, opening the jaws. In the position shown in FIGS. 8 and 9, the cylinder 162 has not yet been filled with high pressure air and, hence, the plunger 160 is in its forwardmost position, keeping the jaws 150a, 150b, 151a and 151b closed and holding the lead core 15 and the lead spacer 11 in the position shown in FIG. 8. When the jaws 150a, 150b, 151a and 151b are closed, the plungers 118, 130 and 136 are retracted, as shown in FIGS. 6, 7 and 8, by the springs (not shown) within the cylinders 119, 131 and 137 (FIG. 1).

When suitable air is supplied to the cylinder 162 (FIG. 9) and cylinders 131 (FIGS. 6 and 8), 119 (FIG. 7) and 137 (FIG. 1), their respective plungers are actuated. The plunger 160 (FIGS. 8 and 9) moves leftward at such time, opening jaws 150a, 150b, 151a and 151b whereupon the lead pair of cores and spacers drop upon and around the mandrel 19. Simultaneously, plungers 118 (FIG. 7), 130 (FIG. 8) and 136 (FIG. 1) are extended pushing back the core 15a (FIG. 8) and spacer 11a (FIG. 7) which are second in line and the weight of the cores and spacers behind the lead pair of cores and spacers is thus taken off of the lead pair, permitting the lead pair to drop freely through the openings 117 and 122 (FIG. 8), because the second in line core 15a and spacer 11a are thereby held slightly spaced from the lead core and lead spacer. As soon as the lead pair of cores and spacers clear the arms 150 and 151 and the jaws 150a, 150b, 151a and 151b have reclosed, the plungers 118, 130 and 136 retract, permitting the cores and spacers to advance and the new lead pair now assumes its position upon the jaws 150a, 150b, 151a and 151b, retraction being done by the springs (not shown) within their respective cylinders once air pressure is released therefrom.

In one embodiment, 40 pairs of cores 11 and spacers 15 are dropped onto a mandrel 19 in about 18 seconds to fully load the mandrel. After the mandrel 19 is fully loaded, the counting device 185 energizes the air circuit to the indexing mechanism 16, which then rotates the table 38 to move the mandrel 19 out from under the openings 117 and 122 (of chutes 30 and 32, respectively) and the place in vertical alignment therewith the next mandrel, mandrel 19a. The cycle is then repeated during which time the cores 11 and spacers 15 drop down onto the mandrel 19a until it is fully loaded at which time the table 38 again indexes rotating the next mandrel 19b into alignment with the holes 117 and 122. In the embodiment shown, the table 38 has six stations to receive six mandrels, but only three mandrels are illustrated.

To facilitate the proper placement of the cores 11 and spacers 15 on the mandrels 19, 19a and 19b transition nose cones 190, 190a, and 190b are frictionally attached to the respective upper end portions of the mandrels.

Referring to the mandrel 19 and the nose cone 190a, the spacers 15 are circular rings, as shown in FIGS. 11 and 13, with a pin 192 extending inwardly. The pins 192 must be placed in the elongated slot 193 (which has an open upper end). The nose cone has a matching elongated slot 194 open at both its upper and lower ends.

The mandrel 19 has a projecting square upper end portion 195 (disposed inwardly of the cylindrical surface of the mandrel). The square portion 195 is frictionally and slidably received in a mating hole 196 formed in the lower end of the nose cone 190. The nose cone 190 has an outer cylindrical surface 196 having a diameter equal to the outer cylindrical surface 197 of the mandrel 19 so that when the projection 195 is inserted into the hold 196 and the lower surface of the nose cone butted against the corresponding surface of the mandrel, a smooth continuous cylindrical surface is formed by the outer surfaces 196 and 197 of the nose cone 190 and of the mandrel 19, respectively.

The nose cone 190 has an uppermost pointed cone portion 198 extending from a cylindrical section 199. The diameter of the cylindrical section 199 is substantially less than the inside diameter of the spacer 15 minus the amount of the inward projection of the pin 192, so as to permit the spacer 15 to freely and easily pass the cone 198 and the cylindrical section 199.

The slot 194 is flared and enlarged at its upper end into a cavity 191 bounded by two symmetrical helical-like surfaces 200 and 201 which come together to a point 202, FIG. 12, the point 202 being spaced from the cylindrical section 199 by a distance about twice the diameter of the pin 192. The surfaces 200 and 201 define the extremity of the outer surface 196 which forms the point 202 at its upper end and which is flush with the outer surface 197 of the mandrel 19. When the spacer 15 drops upon the nose cone 190, of the pin 192 hits the point 202, the pin 192 will slide to one side or the other, engaging either the surface 200 or 201, which will guide the pin 192 into the slot 194. When the spacer 15 drops onto the nose cone 190, it may, of course, engage either the surface 200 or 201 directly (without engaging the point 202).

It was found that there was a tendency for the spacer 15 to cock when it initially engaged the surfaces 200 or 201 and sometimes jamming took place. The jamming usually took place when the pin 192 landed outwardly of the cylindrical surface 196 at the point 202. To eliminate this possible cocking and jamming of the spacer 15, a short radially outwardly extending rib 210 was added spaced from and below the cylindrical section 199 and 180° from the point 202. The upper portion of the rib 210 is also formed with a point, similar to the point 202 previously described. The rib 210 keeps the spacer 15 from being radially displaced to a position where the pin 192 can overly the surface 196 at the point 202. It has also been found that the spacer 15 will better move down the nose cone 15 if the edge 220 is chamfered rather than being sharp.

The indexing mechanism 16 may be any suitable rotary indexing table, but a six station, air operated rack, gear, pawl mechanism with a solenoid control which indexes on a momentary electrical signal is preferred. A suitable six station indexing mechanism is manufactured and sold by Allenair Corp. of Mineola, New York, and designated as Model No. 11-ECC-6. (The "six station" designation refers to the table 38 holding six mandrels and indexing six times during one revolution of the table.)

To operate the core-spacer-core loading machine 10 the switch 250 is pushed to the "on" position energizing the electrical circuit to the entire machine. The jog button 251 is then closed energizing the electrical circuit of the motor 42 and the discs 52 and 54 start to rotate. A supply of cores 11 is placed in the bin 62 on the disc 52 and a supply of spacers 15 is placed in the bin 64 on the disc 54.

When the switch 250 is energized it also starts the electric motor (not shown) of the compressed air supply mechanism (not shown) which supplies air to the hoses 184 and to the cylinders 119, 131 and 162. The chutes 30 and 32 are checked to determine that they are fully loaded and that the plungers 118 and 130 are spaced from the appropriate core and spacer. The lead core is checked to determine that it is properly in place in the opening 114 upon the jaws 150a, 150b, 151a and 151b. Resting upon the lead core is the lead spacer, as shown in FIG. 10.

Also, the appropriate number of mandrels 19, 19a and 19b, each having a nose cone 190, 190a and 190b, respectively, are placed on the indexing table 38.

The start button 254 is then depressed whereupon air is supplied to the cylinder 162 causing the plunger 160 to retract and opening the jaws 150a, 150b, 151a and 151b under the bias of the spring 158, whereupon the lead core and spacer pair drop through the openings 117 and 122 onto the nose cone 190 and past it onto the mandrel 19.

Simultaneously with the supply of air to the cylinder 162, air is also supplied to the cylinders 119, 131 and 137 extending plungers 118, 130 and 136. The engagement of the plunger 118 with the core 11a immediately behind the first core 11 and the engagement of the plunger 130 with the spacer 15a immediately behind the first spacer 15 pushes the core 11a back and also pushes the spacer 15a back taking the weight of the row of cores and the weight of the row of spacers off of the lead pair core 11 and the lead spacer 15, permitting the lead pair to drop freely through the jaws.

The air is then cut off to the cylinders 162, 119, 131 and 137 simultaneously. At such time the spring within the cylinder 162 extends the plunger 160 closing the jaws and the spring within the cylinders 119, 131 and 137 retracts the plungers 118, 130 and 136, permitting the spacers and cores to advance. The jaws close during the time required for the spacers and cores to advance to the next forward position. That is, the jaws close before the second pair of spacers and cores move to the forwardmost position and then the cycle is repeated until the predetermined number of cores and spacers is placed upon the mandrel at which time the indexing mechanism 16 indexes to present the next mandrel 19a under and in alignment with the openings through which the forwardmost cores and spacers drop.

The air to the cylinders 162, 119, 131 and 137 is controlled by a valve 260, shown diagrammatically in FIG. 14, which is actuated by an eccentric cam 262 rotated by a gear box 265 driven by a variable speed motor 264. The valve 260 is connected to a suitable source of high pressure air 189 and each time the valve 260 opens, a pulse of suitable air is delivered to the cylinders 162, 119, 131 and 137 through manifolds 266 and 267 which feed hoses 162a, 119a, 131a and 137a and hoses 184, as illustrated in FIG. 14. Each time the valve 260 closes, the air is released from all these cylinders by a suitable relief opening in the valve 260.

Referring to FIGS. 15 and 16, a modified transition nose cone 280 is illustrated which is similar to the nose cone 190, but which has an enlarged portion 281 which is oblong in cross-section, as viewed in FIG. 16. The enlarged portion 281 is provided to avoid cocking of the spacers and cores as they move down along the nose cone 280. The enlarged portion 281 is disposed in the enlarged portion 282 of the slot 283 and is axially aligned therewith, as shown.

Referring to FIGS. 19 to 25 a modified core-spacer-core loading machine 300 is illustrated. The loading machine 300 comprises a suitable base 302 supporting a hopper and chute assembly 304 and a base 306 supporting a rotatable plate assembly 308 and a fixed arcuate support assembly 310.

The hopper and chute assembly 304 comprises a hopper 312 for cores 314 and a chute 316 extending downwardly from the hopper 312, as shown, to receive the cores 314 and deliver them to the rotatable plate assembly 308.

The hoppers 312 and 322 include rotating discs 326 suitably rotated by motors 328 (FIG. 17) to deliver cores 314 and spacers 322 to the chutes 316 and 324, respectively.

Figure 19:
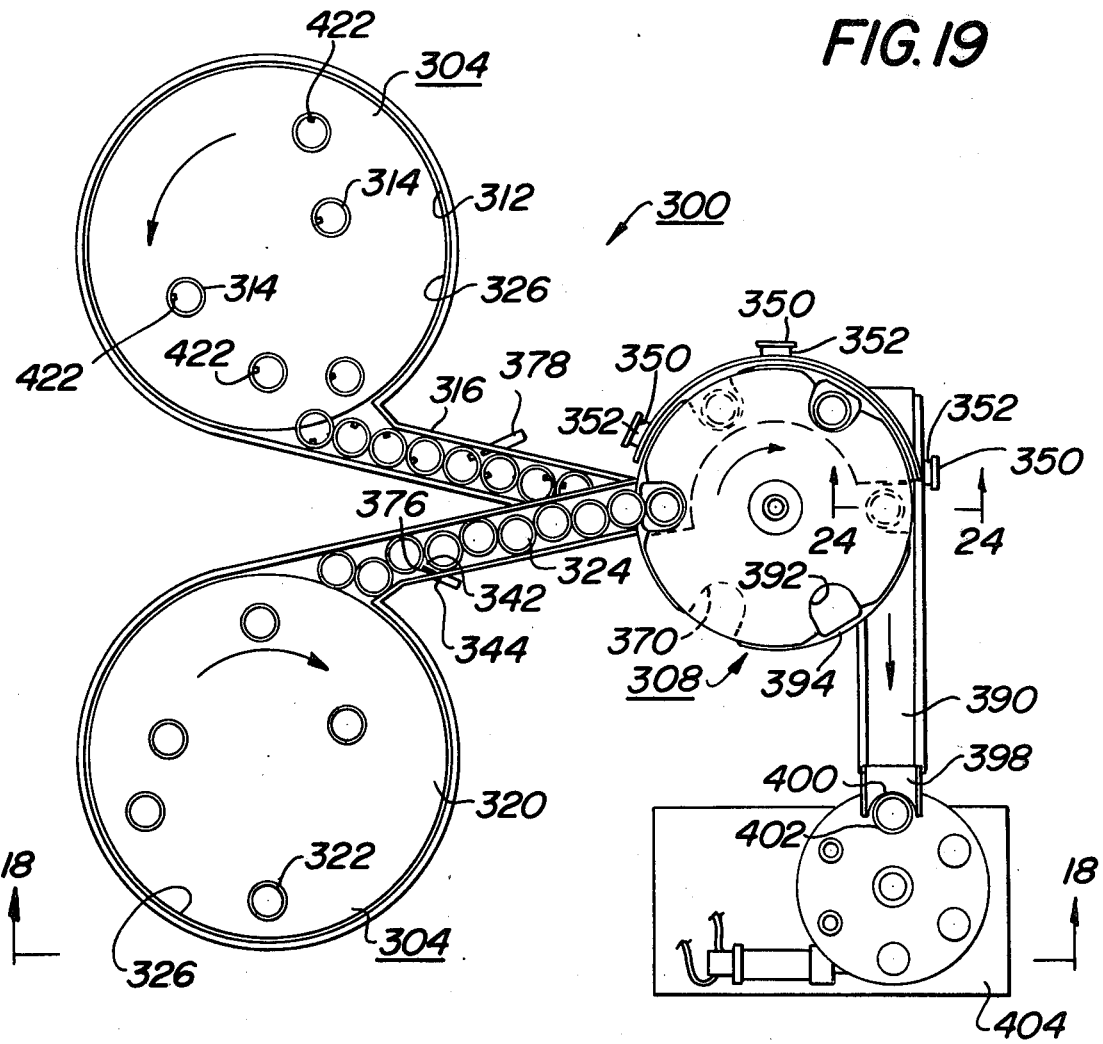
FIG. 19 is a top plan view of the mandrel loading machine shown in FIGS. 17 and 18.
Figure 18:
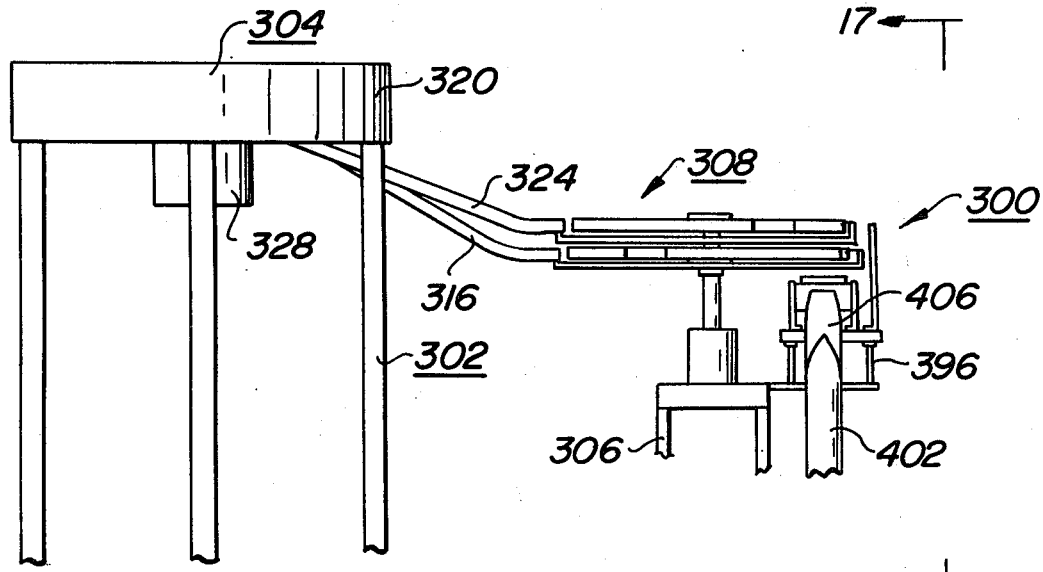
FIG. 18 is a side elevational view of the mandrel loading machine shown in FIG. 17 taken along the line 18—18 in FIG. 19.

The chute 324 delivers a spacer 322 to a pocket 336 formed in a rotatable plate 338, FIGS. 19 and 23. The plate 338 is formed with three pockets 336 equi-spaced around the periphery of the plate 338 and open radially outwardly, as shown in FIG. 23. The peripheral surface of the plate 338 is tapered adjacent the pockets 336 to form curved surfaces 340, shown in FIG. 23, to facilitate rotation of the plate 338 past the loaded chute 324. (While only the trailing edge need be so tapered, the leading edge is also tapered for convenience in assembly.) That is, as the plate 338 rotates past the chute 324, since the chute 324 is loaded with spacers, the spacer next in line tends to partly enter the pocket 336 and must be pushed back by the plate 338.

To better permit the spacers 322 to be pushed back, a plunger 342 which pushes back against one of the spacers 322 in the chute 324 to take the weight off of the forwardmost spacer and to better permit the plate 338 to push the forward group of spacers back sufficiently to permit the plate 338 to rotate past the chute 324. The plunger 342 extends from an air operated cylinder 344.

When the lead spacer 322 enters the pocket 336 it drops upon the arcuate segment 348 which is held stationary by being secured to vertical standard 352 by brackets 350, the standards 352 being secured to the table 354 of the base 306. The arcuate segment 348 comprises a horizontal shelf 356 upon which the spacer 322 is deposited. The arcuate segment 348 has a shoulder 358 to which the brackets 350 are secured, but the shelf 356 extends past the shoulder 358, on the left, to form a receiving station 359, as viewed in FIG. 23, to permit the spacer 322 to enter the pocket 336. After the spacer 322 is deposited upon the shelf 356, continued rotation of the plate 338 will cause the spacer 322 to be pushed clockwise in an arcuate path until it rotates 180° to the right hand end of the segment 348 where the segment is formed with a semi-circular end portion 360 and the spacer 322 drops through the semi-circular opening formed by the end portion 360.

The chute 316 delivers a core 314 to a pocket 370 formed in a rotatable plate 372, FIGS. 19 and 23. The plate 372 has three pockets 370 equi-spaced about the periphery thereof, and open radially outwardly, as shown in FIG. 23. The plates 338 and 372 are positioned relative to each other so that the pockets 336 and 370 are spaced 60° from each other. The peripheral surface of plate 372 is tapered adjacent the pockets to form curved surfaces 374, shown in FIG. 23, to facilitate rotation of the plate past the loaded chute 316. For the same reasons explained in connection with spacer chute 324, the core chute 316 is provided with a plunger 376 extending from an air operated cylinder 378.

Disposed beneath the rotating plate 372 is an arcuate segment 380 which is held stationary by brackets 382, FIG. 25, suitably secured thereto and which are in turn secured to the previously mentioned vertical standards 352. The arcuate segment 380 comprises a horizontal shelf 384 upon which the cores 314 are deposited. The arcuate segment 380 has a shoulder 386 to which the brackets 382 are secured, but the shelf 384 extends past the shoulder 386, on the left, to form a receiving station 387, as viewed in FIG. 23, to permit the cores 314 to enter the pockets 370. After the core 314 is deposited upon the shelf 384, continued rotation of the plate 372 will cause the core 314 to be pushed clockwise in an arcuate path until it rotates 180° to the right hand end of the segment 380 where the segment is formed with a semi-circular end portion 388 and the core drops through the semi-circular opening onto a belt 390.

The plate 372 is provided with three additional openings 392 equi-spaced around the periphery of the plate and between the pockets 370. The openings 392 of plate 372 are vertically aligned with the pockets 336 in the upper spacer plate 338. Thus, when the upper plate 338 pushes a spacer 322 to the semi-circular opening 360 and the spacer 322 then drops through the opening 360 it enters one of the openings 392 and passes through it onto the belt 390.

The plates 338 and 372 are connected together by a shaft 391 and rotated by a motor (not illustrated).

The openings 392 are closed at their peripheral radially outwardly side by arcuate walls 394. The arcuate walls 394 are necessary to prevent cores 314 from entering the openings 392 as the plate 372 rotates past the chute 316.

The belt 390 is suitably supported on a base 396 and suitably driven to deliver the cores and spacers which are alternately deposited upon it to a platform 398, the latter being supported by the base 396. The platform 398 has a semi-circular opening 400, FIG. 19. Disposed below the platform 398 and axially aligned with the opening 400 is a mandrel 402 supported upon an indexing mechanism 404.

The upper portion of the mandrel 402 has frictionally attached to it a transition nose cone 406 comprising a tapered upper section 408 and a lower section 410 of the same outside diameter as that of the mandrel 402. The lower section 410 is formed as two cone-like portions 180° apart to form two points 414 and arcuate guide surfaces 416. The guide surfaces 416 define two spaces 417 (180° from each other) which taper down to the width of the two slots 420 in the mandrel 402, the spaces 417 and slots 420 being in alignment, as shown in FIG. 21.

When the radially inwardly extending pin 422 carried by each core 314 (FIG. 19) engages one of the guide surfaces 416, as the core 314 is rotated, as it moves down, aligning the pin 422 with one of the two slots 420 in the mandrel 402. The two slots 420 are disposed 180° from each other, as shown. Since the cores 314, as seen in FIG. 19, are randomly disposed, in the hopper 312 and chute 316, it is important to provide a transition cone 406 which can align the cores so that their pins 422 will enter one or the other of the slots 420. Further because of the random disposition of the cores 314 some of the pins 422 will enter one of the spaces 417 and the corresponding slot 420 and others of the pins 422 will enter the other of the spaces 417 and the corresponding slot 420.

Thus, cores 314 and spacers 322 are alternately delivered to and placed upon the moving belt 390 which then carries a row of alternating cores and spacers to the platform 398 from which they alternately drop upon the nose cone 406 and the mandrel 402 until the mandrel 402 is loaded. The indexing mechanism 404 may carry additional mandrels 402a, 402b and 402c, as illustrated, which are successively placed under the platform 398 to receive cores and spacers.

Means (not shown) may be provided to block the flow of cores and spacers after the mandrel 402 is fully loaded and to resume the flow after the mandrel 402 is replaced under the platform 398 by successive mandrel 402a.

Referring to FIGS. 26 to 29, a further modification of my invention is illustrated. The modified core-spacer-core loading machine 500 comprises a suitable table 502 supported on a suitable base 504.

The base 504 comprises suitable legs 508 for supporting the table 502. Supported on the base 504 by structural members 505 is a chute and hopper assembly 506.

The chute and hopper assembly 506 comprises a core chute 510 to which are supplied cores 520 from a hopper 521, the hopper 521 being similar to the corresponding hopper illustrated and described in connection with FIGS. 18 to 25. The chute assembly 506 also comprises a spacer chute 516 to which are supplied spacers 522 from a hopper 523, the hopper 523 being similar to the corresponding hopper illustrated and described in connection with FIGS. 18 to 25.

The spacer chute 516 comprises a vertically disposed tube 534, FIGS. 27 and 28, having the upper, and left portion thereof, as viewed in FIG. 28, slotted to receive the forward end of the curved chute 536 whose upper left hand portion is in communication with the hopper 523.

The core chute 510 is similarly constructed having a vertical tube 530, FIG. 29, and a chute 537, FIG. 29.

Mounted upon the table 502 is a reciprocable slide 540 guided between spaced track members 542 and 544 which are secured to the table 502. On opposite sides of the slide 540 are stop blocks 546 and 548 which are also secured to the table 502 for limiting the travel of the slide 540. Aligned with the stop blocks 546 and 548 are limit switches 550 and 552 having blades 554 and 556, respectively, disposed in the path of movement of the slide 540.

The slide 540 is connected at the left-hand end, as seen in FIGS. 26, 27, and 29, by a plunger 560 to a cylinder 562 of a suitable air motor 563 (suitably secured to the table 502), having a piston (not shown) within the cylinder 562 to which the plunger 560 is connected. The air motor 563 is biased by a spring (not shown, but within the cylinder 562) to the leftmost position illustrated in FIGS. 26, 27, and 29. When suitably pressurized air is admitted to the cylinder 562 against the piston (not shown), the plunger 560 moves to the right carrying the slide 540 to the right until the slide 540 engages the blade 556 of the switch 552 at which time the supply of air to the cylinder 562 is terminated and the air is released from the cylinder. The plunger 560 is then returned to the leftmost position by the spring (not shown) within the cylinder 562, carrying with it the slide 540, until the slide 540 engages the blade 554 of switch 550 at which time high pressure air is again admitted to the cylinder to again repeat the cycle.

The table 502 has a hole 570 slightly larger than the cores 520 and spacers 522 and disposed mid-way between the vertically disposed tubes 530 and 534, as shown. The slide has a left-hand hole 572 and a right-hand hole 574 to receive spacers 522 and cores 520, respectively, as it reciprocates upon the table 502 and below the tubes 530 and 534.

When the slide 540 is in the position shown in FIGS. 26, 27, and 29, the hole 572 is spaced below, but in axial alignment with the tube 534, to receive a spacer 522 which drops into the hole 572 and upon the table 502.

When the slide 540 moves to the right, the wall defining the hole 572 engages the bottommost spacer (resting on the table 502) and pushes or slides it along the surface of the table over the hole 570 in the table, whereupon it drops through the table 502 on and around a mandrel 580 which is suitably vertically supported on an indexing mechanism 590 in axial alignment with the hole 570 and below, but adjacent, the table 502. The mandrel 580 is provided with a transition nose cone 582 as described in connection with the previous embodiment. The indexing mechanism 590 may be similar to the indexing mechanism illustrated and described in connection with FIG. 1.

The slide 540 moves to its full rightmost position at which time the hole 574 is moved under and in alignment with the core tube 530 at which time the bottommost core 520 drops into the hole 574 and upon the table 502. When the slide 540 starts to move to the left, the core 520 is engaged by the wall defining the hole 574 pushing and sliding it along the table until it is over the hole 570 at which time it drops over the mandrel 580.

The movement of the slide 540 back and forth, as described, is repeated until the mandrel 580 is fully loaded at which time the cycle is interrupted to permit the indexing mechanism 590 to rotate whereupon the loaded mandrel is most out from under the table 502 and another mandrel is placed axially under the hole 570 to receive the cores and spacers. Removal and replacement of the mandrel may, of course, also be down automatically or manually.

The slide 540 has a thickness slightly less than the thinner of the spacer 522 or core 520. As the slide 540 moves back and forth, the spacer 522 or the core 520 or both are resting upon the upper surface of the slide 540, as seen in FIG. 27. Preferably, the chutes 530 and 536 have lower surfaces which are spaced from the upper surface of the slide 540 by about one-half the thickness of the spacers or cores.

The cores 520 also include radially inwardly extending pins 523 (as in the previous embodiment) which must be placed in one of the two slots 581 formed in the mandrel 580. The nose cone 582 has two converging spaces 583 (defined by guide walls 584) aligned with the slots 581, as in the previous embodiment, for this purpose.

While not shown, it will be seen that more than one mandrel could be loaded simultaneously by suitably modifying my invention.

Also, while I have used air operated pistons and plungers to actuate various members, it will be understood that other types of motors could be used.

Having described my invention, what I claim is:

1. A transition attachment for a core and spacer supporting mandrel wherein said transition attachment comprises means at one end portion of said attachment for securing said attachment to said mandrel, a body having symmetrical guide walls forming a flared entrance opening to receive a portion of said spacer and to axially align said spacer relative to said mandrel, said symmetrical guide walls extending helix-like around said body, and said body being elliptically shaped in cross-section to minimize cocking of said spacer as it enters and moves along said transition attachment.

2. A transition attachment for a core and spacer supporting mandrel wherein said transition attachment comprises means at one end portion of said attachment for securing said attachment to said mandrel, a body having symmetrical guide walls forming a flared entrance opening to receive a portion of said spacer and to axially align said spacer relative to said mandrel, said symmetrical guide walls extending helix-like around said body, a tapered section extending from said body and at the end portion of said body opposite to the end portion having said means, said guide walls form a first slot which may be placed adjacent to and in communication with a corresponding second slot in said mandrel, said guide walls come together to form a pointed portion 180° from said first slot, and an elongated rib extending partially along the length of said transition attachment between said symmetrical guide walls, midway therebetween and aligned with said first slot and spaced from said tapered section to minimize cocking of said spacer as it enters said transition attachment, said tapered section being separated from said rib by a cylindrical section of smaller outside diameter than said rib or said pointed portion, said cylindrical section being separated from said rib by a recessed annular portion, and said tapered section is cone-shaped.

3. The structure recited in claim 2 in combination with a stationary mandrel, said transition attachment is coaxially secured to said mandrel by said means, and said transition attachment and said mandrel have outer cylindrical surfaces of substantially the same diameter.

* * * * *